United States Patent [19]

Holzer et al.

[11] Patent Number: 5,277,944
[45] Date of Patent: Jan. 11, 1994

[54] PROCESS FOR THE MANUFACTURE OF A SHEET OR FILM MADE OF POLYCARBONATE WITH A SOFT SCRATCH-RESISTANT COATING

[75] Inventors: Gerhard Holzer, Aachen; Otto Jandeleit, Alsdorf; Ingrid Musil; Udo Gelderie, both of Aachen, all of Fed. Rep. of Germany

[73] Assignee: Saint-Gobain Vitrage International, Courbevoie, France

[21] Appl. No.: 678,705

[22] Filed: Apr. 1, 1991

[30] Foreign Application Priority Data

Mar. 31, 1990 [DE] Fed. Rep. of Germany ....... 4010485

[51] Int. Cl.$^5$ .......................... B32B 27/36; B05D 1/36
[52] U.S. Cl. ................................. 428/412; 428/423.1; 427/164; 427/412.1; 427/421
[58] Field of Search ...................... 427/163, 164, 412.1, 427/412.2, 421; 428/423.3, 423.1, 412, 424.2

[56] References Cited

U.S. PATENT DOCUMENTS

| | | | |
|---|---|---|---|
| 3,388,032 | 6/1968 | Saunders | 428/412 |
| 3,428,609 | 2/1969 | Chilvers et al. | 428/423.3 |
| 3,447,949 | 6/1969 | Singer | 428/423.3 |
| 3,499,783 | 3/1970 | Nelson et al. | 428/423.3 |
| 4,268,554 | 5/1981 | Gras | 427/299 |
| 4,657,796 | 4/1987 | Musil et al. | 427/164 |
| 4,983,461 | 1/1991 | Daude et al. | 427/163 |
| 5,141,783 | 8/1992 | Corsi et al. | 427/164 |

FOREIGN PATENT DOCUMENTS 8211689   8/1983 Japan.
84132056  1/1986 Japan.
86133725 12/1987 Japan.

Primary Examiner—Shrive Beck
Assistant Examiner—Diana Dudash
Attorney, Agent, or Firm—Oblon, Spivak, McClelland, Maier & Neustadt

[57] ABSTRACT

A process for the manufacture of a plate, sheet or film made of an impact-resistant polymer having thereon a scratch-resistant flexible coating of transparent polyurethane is described comprising the steps of:

(i) applying a first reaction mixture on the plate, sheet or film of impact-resistant polymer, said first reaction mixture comprising:
  (a) an isocynate component and
  (b) a polyol component, and (ii) applying a second reaction mixture onto said first layer before said first layer has completely hardened, said second reaction mixture comprising
  (c) a second isocynate component, and
  (d) a second polyol component.

The first reaction mixture has a composition which guarantees good adhesion to the plate, sheet or film whereas the second reaction mixture exhibits excellent scratch resistance.

20 Claims, No Drawings

PROCESS FOR THE MANUFACTURE OF A SHEET OR FILM MADE OF POLYCARBONATE WITH A SOFT SCRATCH-RESISTANT COATING

BACKGROUND OF THE INVENTION

1. Field of the Invention

The invention relates to a process for the manufacture of a sheet or film made of an impact-resistant polymer such as polycarbonate or polymethyl methacrylate with a scratch-resistant, soft highly flexible surface coating made of a completely transparent polyurethane by applying reaction mixtures containing an isocyanate component and a polyol component, on the sheet or film.

2. Discussion of the Background

It is known to provide sheets or films made of a scratch-sensitive polymer with a soft scratch-resistant layer made of a polyurethane having self-healing properties. This soft scratch-resistant layer can be manufactured either as a prefabricated film and be laminated on the sheet or film by inserting an adhesive layer. It can also be produced on the surface of the sheets or films through direct application of a reaction mixture reacting completely into the polyurethane layer (DE-OS 20 58 504).

If these soft polyurethane layers are to fulfill their function as a scratch-resistant layer, specific demands with respect to their scratch resistance and their functional properties are made of these layers. Polyurethane layers which have these properties are known. However, it has been demonstrated that these known polyurethane compositions are not suitable for the coating of polymers and in particular, for the coating of sheets or films made of polycarbonate, which are to be used, for example, as interior cover layers on glass for motorized ground, air and naval vehicles or building window glass panes. In particular, the known scratch-resistant layers of this kind have the drawback that they adhere poorly to the polycarbonate. It was been proposed to increase the adhesion of the soft polyurethane layers on the polycarbonate through the addition of inorganic chromium salts, but it has been shown that the improved adhesion attempted in this manner is inadequate. In addition, chromium salts are toxic and only slightly soluble in the reaction mixture.

Especially high demands are made of the adhesion between the soft scratch-resistant layer and the polycarbonate film in those cases in which a coated polycarbonate sheet is attached to a glass pane in order to manufacture a breakthrough or bulletproof laminated glass pane at raised temperatures and raised pressures. Here, the initial layer arrangement, at a pressure of about 10 atm., is subjected to a temperature of about 140° C. The bonding process produces significant mechanical stresses within the layers. It has been demonstrated that the adhesion between the polycarbonate sheet and the soft, scratch-resistant coating according to prior art is weakened during this heat-pressure treatment so that it cannot withstand subsequent tests. If scratch-resistant coatings based on solvent-containing systems are used, there is the added feature that with just the smallest amount of residual solvent the polycarbonate shows marked stress cracking.

SUMMARY OF THE INVENTION

One object of the invention is to provide a soft scratch-resistant coating that is especially suitable for the scratch-resistant coating of sheets or films made of polycarbonate or other equivalent polymers such as polymethyl methacrylate, polyvinyl chloride, cellulose propionate and cellulose acetate, and which exhibits both the desired mechanical and physical properties such as complete transparency, low turbidity, good resilience and self-healing capability with surface stresses and good functional properties, as well as high adhesion to the polycarbonate surface, and which also can withstand extreme stresses.

This and other objects have been achieved by the present invention in which two different, solvent-free reaction mixtures are applied in succession on a plate, sheet or film made of a scratch sensitive polymer, such as polycarbonate. More specifically, the mixtures comprise:

(a) a first reaction mixture capable of forming a first polyurethane layer, this mixture containing as an isocyanate component, at least one aliphatic or cycloaliphatic diisocyanate and, as a polyol component, at least one bifunctional polyol whose molecular weight ranges from 500–4,000 and at least one polyol having a functionality greater than 2, the ratio of the NCO groups to the OH groups (NCO/OH) ranging preferably between 0.7 and 1.3; and (b) a second reactive mixture capable of forming a second polyurethane coating, this second mixture containing as the isocyanate component, at least one trifunctional isocyanate component selected, in particular, from among the biurets or isocyanurates of 1,6-hexamethylene diisocyanate and, as the polyol component, at least one trifunctional polyol having a molecular weight between 250–4,000 and chosen from among the group of polyetherpolyols, polyetherpolyols and polycaprolactonepolyols.

DETAILED DESCRIPTION OF THE PREFERRED EMBODIMENTS

According to the invention, two polyurethane layers of different compositions and with different functions are applied. The object of the first layer is to ensure a good and permanent bonding with the scratch-sensitive polymer, preferably polycarbonate, whereas the second layer must fulfill the specifications with respect to scratch resistance and functional properties while the two layers must combine together into a transparent combination. Whereas the second reaction mixture corresponds to compositions known for the manufacture of soft scratch resistant layers, the first reaction mixture has a composition that is novel and unknown for the manufacture of soft scratch-resistant layers. A scratch-resistant coating on polycarbonate or other scratch-sensitive polymers such as polymethyl methacrylate, polyvinyl chloride, cellulose propionate and cellulose acetate, which meets the practical requirements from all significant standpoints, is made possible only by combining these two layers.

Diisocyanates which may be used to prepare the first polyurethane layer are aliphatic or cycloaliphatic diisocyanates. Suitable bifunctional isocyanates include hexamethylenediisocyanate (HMDI), 2,2,4-trimethyl-1,6-hexanediisocyanate (TMDI), bis-4-isocyanatocyclohexylmethane (Hylene W), bis-3-methyl-4-isocyanatocyclohexylmethane, 2,2-bis-(4-isocyanatocyclohexyl)propane, 3-isocyanatomethyl-3,5,5-tricyclohexylisocyanate (also called isophorene diisocyanate, IPDI), m-xylylenediisocyante (XDI), m- and p- tetramethylxylylene diisocyanate (m- and p-TMXDI), trans-cyclohexane-1,4-diisocyanate (CHDI), and 1,3-diisocyanatomethyl-cyclohexane (hydrogenated XDI).

Isophorone diisocyanate (IPDI) is preferred, and particularly preferred is a mixture of IPDI with the product of mixing isocyanate and urea.

Polyols suitable for preparing the first polyurethane layer include polyetherdiols and polyesterdiols having molecular weights ranging from 500–4,000. The polyesterdiols are esterification products of diacids such as adipic, succinic, palmitic, azelaic, sebacic, and o-phthalic acid and a diol such as ethylene glycol, 1,3-propanediol, 1,4-butanediol, 1,6-hexanediol, for example. The polyetherdiols have the following general formula:

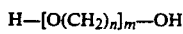

where n equals 2–6 and m is such that the molecular weight is between 500 and 4,000. The polyethers may also have the general formula:

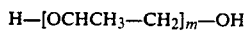

where m is such that the molecular weight is between 500 and 4,000. In addition to polyetherdiols and polyesterdiols, polycaprolactonediols and polycarbonatediols may be used.

Suitable polyols having a functionality greater than 2, are for example, monomeric aliphatic triols, such as glycerol and trimethylolpropane, triols having polyether chains, polycaprolactone triols, the molecular weight of these triols generally ranging between 90 and 1,000, and mixed polyetherpolyester polyols whose functionality is greater than 2, for example, a functionality between 2 and 3.

The particularly preferred reactive mixtures for the first and second layers according to the invention are:

(a) for the first layer, a reactive mixture whose isocyanate component contains a cycloaliphatic polyisocyanate containing a product obtained by adding isocyanate, urea and isophorene diisocyanate and having an NCO group content of from 24 to 32% by weight, and whose polyol component contains a bifunctional polyol polyester having an OH group content of from 2.8 to 3.5% by weight and a trifunctional polycaprolactone having an OH group content of between 8.5 and 11% by weight, and (b) for the second layer, a reactive mixture whose isocyanate component contains a trifunctional 1,6-diisocyanatohexamethylene-based aliphatic polyisocyanate having a biuret or isocyanurate structure and an NCO group content of 12.6 to 28% by weight, and whose polyol component contains a polyether polyol whose OH group content is between 9 and 13% by weight formed from a product of the condensation of propylene oxide with trimethylolpropane, or of a trifunctional polycaprolactone whose OH group content is between 8.5 and 11% by weight.

Preferably, the first reaction mixture contains a polyisocyanate with a NCO group content ranging from 27 to 29 wt. %, more preferably about 28 wt. %; a bifunctional polyester polyol with an OH group content ranging from 3.2 to 3.4 wt. %, more preferably about 3.3 wt. %; and a trifunctional polycaprolactone with an OH content ranging from 9.5 to 9.7 wt. %, more preferably about 9.6 wt. %.

The second reaction mixture preferably contains a trifunctional aliphatic polyisocyanate with a NCO group content ranging from 22 to 26 wt. %, more preferably about 23 wt. %; a polyether polyol with an OH content ranging from 11.7 to 11.9 wt. %, more preferably about 11.8 wt. %, or a trifunctional polycaprolactone with an OH content ranging from 9.5 to 9.7 wt. %, more preferably about 9.6 wt. %.

Additives may be added to both reaction mixtures such as dibutyl tin dilaurate in a quantity of up to 0.5 wt.% as a catalyst; modified polysiloxane copolymers or fluorinated alkyl esters in a quantity ranging from 0.05 to 0.5 wt % as a flow control agent; bis(1,2,2,6,6-pentamethyl-4-piperidyl)sebacate in a quantity ranging from 0.5 to 2 wt % as a light stabilizer, and optionally an ultraviolet absorber, such as a substituted benzotriazole, in a quantity ranging from 0.5 to 5 wt %.

One advantage of the present process is that it does not require a specific preliminary treatment of the substrate before coating with the first polyurethane layer. In particular, it is not necessary to prime the surface of the substrate or to treat it with chemical compounds which generally have the disadvantage of weakening the mechanical resistance properties of the substrate.

The reaction mixtures may be applied to the polymer surface, preferably to a polycarbonate polymer surface, by any known coating means. Preferred coating methods are application by spraying the reaction mixtures.

In a preferred embodiment, the first layer is sprayed on the substrate, then partially polymerized just prior to being coated by spraying of the second layer. By proceeding in this fashion, a very effective cohesion of the two layers is obtained and the total polymerization time of the two layers is reduced. The degree of polymerization of the first layer before coating with the second layer generally ranges from about 40 to 80%.

The coated polycarbonate sheets of the present invention may be used to prepare laminated breakage-resistant and/or shot-retarding laminated glass articles. For example, a polycarbonate sheet having been coated with the two polyurethane reaction mixtures of the present invention may be bonded to a single glass pane or a laminated multilayer glass pane by applying a thermoplastic adhesive layer between the glass pane and the surface of the polycarbonate which is not coated with the soft, scratch-resistance cover layer. Any thermoplastic adhesive, which is conventionally used to bond glass panes, may be used to bond the polycarbonate and glass panes. The shot-retarding laminated glass is prepared by autoclaving the polycarbonate-glass laminate in an autoclave at elevated temperature and pressure. Suitable temperatures and pressures in the autoclaving process itself are well known to those skilled in the art.

Other features of the invention will become apparent in the course of the following descriptions of exemplary embodiments which are given for illustration of the invention and are not intended to be limiting thereof.

EXAMPLES

Comparison example

A 3 mm thick sheet made of polycarbonate (MAKROLON, product of Bayer or LEXAN, product of General Electric) was provided with a 0.3 mm thick, soft, scratch-resistant layer according to the prior art. To this end, a solvent-free reaction mixture containing (1) 100 g of trifunctional aliphatic polyisocyanate prepared from 1,6-hexamethylene diisocyanate having a biuret structure and with a NCO group content of 23 wt %, (DESMODUR N 3200, product of Bayer),
(2) 100 g of polyether polyol having an OH group content of 11.8 wt %,
(3) 0.3 g of dibutyl tin dilaurate,
(4) 0.1 g of a fluorinated alkyl ester, and
(5) 0.1 g of bis(1,2,2,6,6-pentamethyl-4-piperidyl)-sebacate, was prepared and sprayed on the polycarbonate sheet in a uniformly thick layer with the aid of a spray nozzle. The layer was left to harden for 20 minutes at 120° C.

The polycarbonate sheet provided with the hardened polyurethane layer was subjected to a temperature cycle that corresponds to the temperature cycle of an autoclave process to manufacture laminated glass panes, that is, heated slowly to 140° C., held for one hour at 140° C. and subsequently cooled slowly to room temperature.

The adhesion of the polyurethane layer on the polycarbonate sheet was determined according to the so-called "peel test". This peel test consists of peeling a strip of coating from a coated substrate, that is, for example a 5 cm wide strip, at a 90° angle from the substrate and in so doing measuring and recording the force required. The tear-away speed was 5 cm/mm.

Whereas the adhesion values prior to conducting the heat cycle are so high that a separation of both materials in not possible (adhesion not measurable), the adhesion values drop after carrying out the heat cycle to a value of 11 N/cm. The adhesion values decrease even further to 5 N/cm if a "humidity test", in which the coated film is subjected to a relative atmospheric humidity ranging from 95 to 98% for 14 days at 50° C., follows the heat cycle. A polycarbonate sheet coated in such a manner is not useful in practice.

EXAMPLE 1

A 3 mm thick sheet made of polycarbonate (MAKROLON) was coated with a 200 micron thick layer of a solvent-free reaction mixture of the following composition with the aid of a spray nozzle:
(1) 33.3 g of cycloaliphatic polyisocyanate containing an isocyanate urea adduct dissolved in isophorone diisocyanate and having a NCO group content of 28 wt % (polyisocyanate IPDI-H 2921, product of Huels AG),
(2) 80 g of a bifunctional hydroxyl group containing polyester having an OH group content of 3.3 wt % (OXYESTER T 1136, product of Huls AG),
(3) 20 g of solvent-free trifunctional polycaprolactone having an OH group content of 9.6 wt % (TONE 305, product of Union Carbide),
(4) 0.06 g of dibutyl tin dilaurate,
(5) 0.1 g of a fluorinated alkyl ester.

After 10 to 12 hours at room temperature the layer had hardened to about 90%. In this state owing to the residual isocyanate groups that have not bonded yet, it exhibited a stickiness on the surface, which was no longer present after total hardening under the influence of atmospheric humidity after 1 to 2 days. This surface activity, however, does not interfere with the application of the second layer.

To manufacture the second layer a solvent-free reaction mixture of the following composition was applied onto the first layer in a layer thickness of 300 microns also with the aid of a spray nozzle:
(1) 100 g of a trifunctional aliphatic polyisocyanate prepared by reacting 1,6-hexamethylene diisocyanate and urea with a biuret structure and with a NCO group content of 23 wt %,
(2) 97 g of a trifunctional polycaprolactone having an OH group content of 3.6 wt %,
(3) 0.15 g of dibutyl tin dilaurate,
(4) 0.1 g of a fluorinated alkyl ester,
(5) 0.1 g of bis(1,2,2,6,6-pentamethyl-4-piperidyl)-sebacate, and
(6) 0.2 g of a substituted benzotriazole.

The layer was left to harden for 24 hours at room temperature. The polycarbonate sheet provided with this two-layer coating was subjected to the same temperature cycle to which the comparison example described above was subjected, and then the adhesion of the layer on the polycarbonate sheet was determined according to the peel test described in the comparison example. Separation of the layers was not possible.

Example 2

A 1 mm thick film made of LEXAN was coated by a procedure analogous to that described in Example 1, where the reaction mixture had the following composition:

First Reaction Mixture:
(1) 24.5 g of solvent-free cycloaliphatic polyisocyanate containing an isocyanate urea adduct dissolved in isophorone diisocyanate and having a NCO group content of 28 wt %,
(2) 10.5 g of solvent-free isophorone diisocyanate having a NCO content of 37.3 wt % (IPDI product of Huels AG),
(3) 80 g of solvent-free bifunctional hydroxyl group containing polyester having an OH group content of 3.3 wt %,
(4) 20 g of solvent-free trifunctional polycaprolactone having an OH group content of 9.6 wt %,
(5) 0.05 g of dibutyl tin dilaurate,
(6) 0.3 g of modified polysiloxane copolymer. Second Reaction Mixture:
(1) 100 g of solvent-free trifunctional aliphatic polyisocyanate, prepared by reacting 1,6-hexamethylene diisocyanate and urea, having a biuret structure and with a NCO group content of 23 wt %,
(2) 93 g of solvent-free trifunctional polycaprolactone an OH group content of 9.6 wt %,
(3) 0.05 g of dibutyl tin dilaurate,
(4) 0.4 g of a modified polysiloxane copolymer,
(5) 0.1 g of bis(1,2,2,6,6-pentamethyl-4-piperidyl)sebacate, and
(6) 0.2 g of a substituted benzotriazole.

The adhesive strength according to the peel test showed that a separation of the coating from the LEXAN film was not possible.

Example 3

The procedure was analogous to that described in Example 1, but the reaction mixtures had the following composition:

First Reaction Mixture:
(1) 50 g of solvent-free cycloaliphatic polyisocyanate containing an isocyanate urea adduct dissolved in isophorone diisocyanate and having a NCO group content of 28 wt %,
(2) 50 g of solvent-free bifunctional hydroxyl group containing polyester having an OH group content of 3.3 wt %,
(3) 50 g of solvent-free trifunctional polycaprolactone having an OH group content of 9.6 wt %, (4) 0.5 g of dibutyl tin dilaurate,
(5) 0.1 g of a fluorinated alkyl ester Second Reaction Mixture:
(1) 100 g of solvent-free trifunctional aliphatic polyisocyanate prepared from 1,6-hexamethylene diisocyanate and urea with an isocyanurate structure and a NCO group content of 23 wt %,
(2) 95 g of solvent-free polyether polyol having an OH group content of 11 wt % from a condensation product of propylene oxide with trimethylolpropane,
(3) 0.05 g of dibutyl tin dilaurate,
(4) 0.1 g of a fluorinated alkyl ester,
(5) 0.1 g of bis(1,2,2,6,6-pentamethyl-4-piperidyl)-sebacate, and
(6) 0.2 g of a substituted benzotriazole.

The two layers were hardened respectively at about 120° C. under a heat lamp during a hardening period of 20 minutes respectively.

The adhesive strength of the coating manufactured on the polycarbonate sheet in accordance with the peel test, after carrying out the temperature cycle described in the comparison example, showed that the coating could not be separated from the substrate.

Example 4

A polycarbonate sheet (5 mm thick) that was provided with a soft, scratch resistant coating an one side in accordance with Example 3, was processed into a bullet proof vehicle windshield pane with other layers of silicate glass and thermoplastic adhesive layers. To this end, several silicate glass panes, each having a thickness of 5 mm, were bent in a known manner into the desired shape so as to lie one on top of the other together. The silicate glass panes bent together were then separated and put together again into a layer packet, in horizontal position, with thermoplastic intermediate layers of polyvinyl butyral, and in particular with the concave side turned upward. On the uppermost silicate glass panes was placed a film that was about 1.5 mm thick and made of a thermoplastic polyurethane (PE 192, product of Quinn), and on this thermoplastic polyurethane film was placed the coated polycarbonate sheet with the soft scratch-resistant coating turned upward. This layer packet was degassed by vacuum treatment in a reduced pressure chamber and in particular according to the process described in the DE-PS 20 24 781. The layer packet in the vacuum chamber was enclosed by a jacket opened at least on one side and made of a flexible vacuum-tight material, for example, a film of polyamide and whose opening was welded shut following degassing. The degassed layer packet and the jacket were then subjected to the actual bonding process in an autoclave in which the layer packet, at a temperature of 130° C., was subjected to a pressure of about 12 atm. After about 2 hours, the excess pressure was eliminated and the final compressed laminated glass pane was removed from the jacket following cooling to room temperature.

The substrate coated with the double layer according to the present invention may be advantageously used for the manufacture of building windows, such as breakage-resistant, bulletproof windows, windows of motorized vehicles including automobiles, trains and airplanes, for example airplane windows and airplane port holes.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the U.S. is:

1. A process for the manufacture of a plate, sheet or film made of an impact-resistant polymer having thereon a scratch-resistant, flexible coating of transparent polyurethane, comprising the steps of:
   (i) applying a first reaction mixture on the plate, sheet or film of impact-resistant polymer, said first reaction mixture comprising:
   (a) an isocyanate component consisting essentially of at least one aliphatic or cycloaliphatic diisocyanate, and
   (b) a polyol component consisting essentially of a bifunctional polyol whose molecular weight ranges from 500 to 4,000 and at least one polyol having a functionality greater than 2, wherein the NCO/OH group ratio ranges from 0.7 to 1.3 to form a first polyurethane layer, and (ii) applying a second reaction mixture onto said first polyurethane layer before said first layer has completely hardened, said second reaction mixture comprising
   (c) a second isocyanate component consisting essentially of at least one trifunctional aliphatic 1,6-diisocyanatohexamethylene polyisocyanate having a biuret or isocyanate structure, and
   (d) a second component consisting essentially of at least one trifunctional polyetherpolyol, polyesterpoltyol or polycaprolactonepolyol having a molecular weight between 250 and 4,000.

2. The process of claim 1, wherein said component (a) is a cyloaliphatic diisocyanate obtained by combining an isocyanate, a urea and isophorone diisocyanate and having an NCO group content of from 24 to 32% by weight,
said polyol component (b) consists essentially of a bifunctional polyester polyol having an OH group content of from 2.8 to 3.5% by weight and a trifunctional caprolactone having an OH group content of between 8.5 and 11% by weight,
said second isocyanate component (c) is a trifunctional aliphatic 1,6-diisocyanatohexamethylene polyisocyanate having a biuret or isocyanurate structure and a NCO group content of 12.6 to 28% by weight, and
said second polyol component (d) is a trifunctional polyether polyol having an OH group content between 9 and 13% by weight which is a product of condensing propylene oxide with trimethylol propane, or a trifunctional polycaprolactone polyol having an OH group content of between 8.5 and 11% by weight.

3. The process of claim 2, wherein said component (a) cycloaliphatic diisocyanate has an NCO group content ranging from 27 to 29 wt %, said component (b) bifunctional polyester polyol has an OH group content ranging from 3.2 to 3.4 wt %, and said component (b) trifunctional caprolactone is a trifunctional polycaprolactone with an OH group content ranging from 9.5 to 9.7 wt. %.

4. The process of claim 3, wherein said cycloaliphatic diisocyanate NCO group content is about 28 wt. %.

5. The process of claim 3, wherein the OH group content of said bifunctional polyester polyol is about 3.3 wt. %.

6. The process of claim 3, wherein the OH content of said trifunctional polycaprolactone is about 9.6 wt. %.

7. The process of claim 3, wherein said second isocyanate compound has a NCO group content ranging from 22 to 24 wt %, and said trifunctional polyether polyol has an OH group content ranging from 1.7 to 11.9 wt %, or said trifunctional polycaprolactone has an OH group content ranging from 9.5 to 9.7 wt %.

8. The process of claim 7, wherein the NCO group content of said second isocyanate compound is about 23 wt. %.

9. The process of claim 7, wherein the OH group content of said trifunctional polyether polyol is about 11.8 wt. %.

10. The process of claim 7, wherein the OH group content of said trifunctional polycaprolactone is about 9.6 wt %.

11. The process of claim 1, wherein said first reaction mixture, second reaction mixture or both reaction mixtures are applied by spraying.

12. The process of claim 1, wherein the second reaction mixture is applied after the first reaction mixture has reached a degree of polymerization ranging from 40 to 80%.

13. The process of claim 1, wherein both reaction mixtures further contain a reaction catalyst in a quantity up to 0.5 % and a flow control agent in a quantity ranging from 0.05 to 0.5 wt %.

14. The process of claim 13, wherein said reaction catalyst is dibutyl tin dilaurate.

15. The process of claim 13, wherein said flow control agent is a modified polysiloxane copolymer or a fluorinated alkyl ester.

16. The process of claim 1, wherein the second reaction mixture further contains a light stabilizer in a quantity ranging from 0.5 to 2 wt % or an ultraviolet absorber in a quantity ranging from 0.5 to 5 wt %.

17. The process of claim 16, wherein said light stabilizer is bis(1,2,2,6,6-pentamethyl-4-piperidyl)sebacate.

18. The process of claim 16, wherein said ultraviolet absorber is a substituted benzotriazole.

19. The process of claim 16, wherein said first reaction mixture also further contains a light stabilizer in a quantity ranging from 0.5 to 2 wt. % or an ultraviolet absorber in a quantity ranging from 0.5 to 5 wt. %.

20. An impact-resistant polymer plate, sheet or film having a scratch-resistant, soft, flexible surface coating, comprising:
a plate, sheet or film of impact-resistant polymer prepared by the process of claim 1.

* * * * *